US008712413B2

(12) United States Patent
Pudney et al.

(10) Patent No.: US 8,712,413 B2
(45) Date of Patent: Apr. 29, 2014

(54) TELECOMMUNICATIONS SYSTEM AND METHOD

(75) Inventors: Christopher David Pudney, Newbury (GB); David Andrew Fox, Newbury (GB); Ratna Ganeshanandan, Newbury (GB)

(73) Assignee: Vodafone Intellectual Property Licensing Limited, Newbury, Berkshire (GB)

( * ) Notice: Subject to any disclaimer, the term of this patent is extended or adjusted under 35 U.S.C. 154(b) by 467 days.

(21) Appl. No.: 12/653,654

(22) Filed: Dec. 16, 2009

(65) Prior Publication Data

US 2010/0222058 A1  Sep. 2, 2010

(30) Foreign Application Priority Data

Dec. 16, 2008  (GB) .................................. 0822849.6

(51) Int. Cl.
*H04W 4/00* (2009.01)
(52) U.S. Cl.
USPC ..................... 455/435.2; 455/436; 455/552.1; 455/572; 455/574; 370/338
(58) Field of Classification Search
USPC ........... 455/435.2, 436, 572, 573, 574, 552.1; 370/338
See application file for complete search history.

(56) References Cited

U.S. PATENT DOCUMENTS

| | | | |
|---|---|---|---|
| 6,175,735 B1 * | 1/2001 | Meyer ............................ | 455/440 |
| 6,487,425 B1 * | 11/2002 | Thakker et al. ................ | 455/574 |
| 6,775,255 B1 * | 8/2004 | Roy ............................... | 370/331 |
| 7,463,886 B2 * | 12/2008 | Salokannel et al. ........ | 455/426.1 |
| 7,769,382 B2 * | 8/2010 | Rasanen ........................ | 455/436 |
| 7,813,772 B2 * | 10/2010 | Camp et al. .................... | 455/574 |
| 7,941,154 B2 * | 5/2011 | Barbaresi et al. ............. | 455/451 |
| 8,565,105 B2 * | 10/2013 | Diab et al. ..................... | 370/252 |
| 2002/0068570 A1 * | 6/2002 | Abrol et al. ................... | 455/438 |
| 2003/0114158 A1 * | 6/2003 | Soderbacka et al. .......... | 455/436 |
| 2003/0233461 A1 * | 12/2003 | Mariblanca-Nieves et al. ............................. | 709/228 |
| 2005/0026616 A1 * | 2/2005 | Cavalli et al. ................. | 455/436 |
| 2006/0223465 A1 * | 10/2006 | Akiba et al. ................ | 455/127.4 |
| 2007/0049274 A1 * | 3/2007 | Yacobi et al. ................. | 455/436 |
| 2007/0217556 A1 * | 9/2007 | Pietraski ........................ | 375/350 |
| 2007/0238460 A1 * | 10/2007 | Yamen .......................... | 455/436 |
| 2007/0268873 A1 | 11/2007 | Borella et al. | |

(Continued)

FOREIGN PATENT DOCUMENTS

| | | |
|---|---|---|
| EP | 1578165 A1 | 9/2005 |
| WO | WO 00/04740 | 1/2000 |
| WO | WO2005/060296 A1 | 6/2005 |
| WO | WO2005/101880 A1 | 10/2005 |

*Primary Examiner* — Kamran Afshar
*Assistant Examiner* — Mong-Thuy Tran
(74) *Attorney, Agent, or Firm* — Muirhead and Saturnelli, LLC

(57) ABSTRACT

In a mobile telecommunications network including at least a first type of radio access network and a second type of radio access network and a mobile terminal, a method of establishing a voice communication with the mobile terminal including: receiving a voice communication request in relation to the mobile terminal on the second radio access network type; determining a parameter associated with a terminal characteristic; and using the parameter to determine whether to establish the voice communication on the first type of radio access network or maintain the voice communication on the second type of radio access network. Preferably the determined parameter is a parameter relating to a terminal type for the mobile terminal, and is determined from the terminal's IMEI.

26 Claims, 4 Drawing Sheets

(56) References Cited

U.S. PATENT DOCUMENTS

| | | | |
|---|---|---|---|
| 2008/0058000 A1* | 3/2008 | Tanaka et al. | 455/550.1 |
| 2008/0069063 A1* | 3/2008 | Li et al. | 370/338 |
| 2008/0081623 A1* | 4/2008 | Burgan et al. | 455/436 |
| 2008/0095120 A1* | 4/2008 | Hong et al. | 370/332 |
| 2008/0119199 A1  | 5/2008 | Hamano et al. | 455/455 |
| 2008/0254820 A1* | 10/2008 | Alpert et al. | 455/522 |
| 2008/0261596 A1* | 10/2008 | Khetawat et al. | 455/436 |
| 2008/0298320 A1* | 12/2008 | Ligonniere et al. | 370/331 |
| 2008/0299976 A1* | 12/2008 | Gallagher et al. | 455/436 |
| 2009/0141631 A1* | 6/2009 | Kim et al. | 370/235 |
| 2009/0253469 A1* | 10/2009 | Herczog | 455/573 |
| 2010/0002662 A1* | 1/2010 | Schmidt et al. | 370/338 |
| 2010/0113025 A1* | 5/2010 | Martin et al. | 455/436 |
| 2010/0115048 A1* | 5/2010 | Scahill | 709/213 |
| 2010/0136967 A1* | 6/2010 | Du et al. | 455/432.3 |
| 2010/0273486 A1* | 10/2010 | Kharia et al. | 455/436 |

\* cited by examiner

TELECOMMUNICATIONS SYSTEM AND METHOD

FIELD OF THE INVENTION

The present invention relates to a system and method for controlling a mobile terminal in a telecommunications environment. More particularly, the present invention relates to a system and method for controlling mobile terminal handover in a telecommunications environment where a 2G network coexists with a 3G network.

BACKGROUND

When GSM (Global System for Mobile communications) was initially designed, it was designed as a Circuit Switched technology, to carry voice and signalling. As the industry developed there was a desire to transport data; GPRS (General Packet Radio Service) was thus designed. The design of GPRS was based upon GSM, however, in the end the two technologies were not wholly compatible, to the extent that only one technology could be active at any one time, with the voice element (GSM) generally taking precedence.

Some further design work was completed to allow the simultaneous use of packet switched data traffic and circuit switched voice, resulting in the technology called Dual Transfer Mode (DTM). Whilst DTM allows greater compatibility between GPRS and GSM, the costs for implementing it in handset and the network are significant, and it does not provide a decent data rate, instead only resulting in low packet data rates. Therefore most handsets and networks don't support the DTM functionality.

In contrast, the 3G technology (e.g. UMTS) from the beginning was designed with the particular aim to enable mobile terminals to access both the circuit switched (voice) and the packet switched (data) domains simultaneously, and therefore it became intrinsic to the technology.

Today, in many regions GSM networks coexist with 3G networks, and the majority of mobile terminals are capable of operating on both types of network.

To facilitate the coexistence of the GSM and 3G networks, handover functionality has been incorporated into their design, which allows an operator to provide seamless support for voice across the two technologies. The Handover facility was developed in order to allow terminals to be moved between the two technologies because of differences in coverage between the technologies, and therefore the Radio controller (BSC/RNC) is responsible for triggering the handover process.

However, since 3G has been deployed, there has been a big uptake in data traffic, resulting in greater congestion in the 3G networks. This congestion is compromising the ability to be able to provide the required peak data rates and performance.

There is therefore a need to overcome or at least ameliorate this problem.

SUMMARY OF THE INVENTION

According to one aspect, the present invention provides, in a mobile telecommunications network including at least a first type of radio access network and a second type of radio access network and a mobile terminal, a method of establishing a voice communication with the mobile terminal including: receiving a voice communication request in relation to the mobile terminal on the second radio access network type; determining a parameter associated with a terminal characteristic; and using the parameter to determine whether to establish the voice communication on the first type of radio access network or maintain the voice communication on the second type of radio access network.

In a further aspect, the present invention provides in a mobile telecommunications network including at least a first type of radio access network and a second type of radio access network and a mobile terminal, a method of establishing a handover situation for a voice communication with the mobile terminal, the method including: determining a parameter associated with a characteristic of the terminal; using the parameter to determine whether to handover the voice communication to the first type of radio access network or maintain the voice communication on the second type of radio access network.

Preferably the terminal characteristic that the parameter is associated with is a terminal type identifier. It is also preferable that the terminal type identifier is determined using the terminal's IMEI. The first radio access network type may be a 2G network and the second radio access network type may be a 3G network. The decision whether or not to establish the voice communication can therefore be made based upon the terminal type. In other words, it is preferable that certain types of mobile terminals are excluded, so that some types of mobile terminal are never offloaded to GSM.

In this way, this aspect of the invention has recognised that to provide the required peak data rates, space needs to be made available on the 3G carriers, and that to create this space, without adversely affecting the provision of other services, it is possible, and beneficial to offload voice traffic on to the sometimes less loaded GSM network, as the voice traffic does not require the benefits of the 3G carrier.

The invention has particular application in regions where the 3G network capacity is low, such as in rural areas.

In another aspect, the present invention provides in a mobile telecommunications network including at least a first type of radio access network supporting only voice communications, a second type of radio access network supporting both voice and data communications and a mobile terminal registered for use with the second radio access network type, a method of establishing a voice communication with the mobile terminal including: receiving a communication request in relation to the mobile terminal on the second radio access network type; determining whether the communication request relates only to a voice communication request; and where the communication relates only to a voice communication request, handing the mobile terminal over to the first type of radio access network to establish the communication thereon. Preferably the first radio access network type is 2G, such as GSM, and the second radio access network type is 3G.

Other aspects of the invention are set out in the attached claims.

BRIEF DESCRIPTION OF THE DRAWINGS

The present invention will now be described with reference to the accompanying Figures, in which.

DETAILED DESCRIPTION

Figure 1:
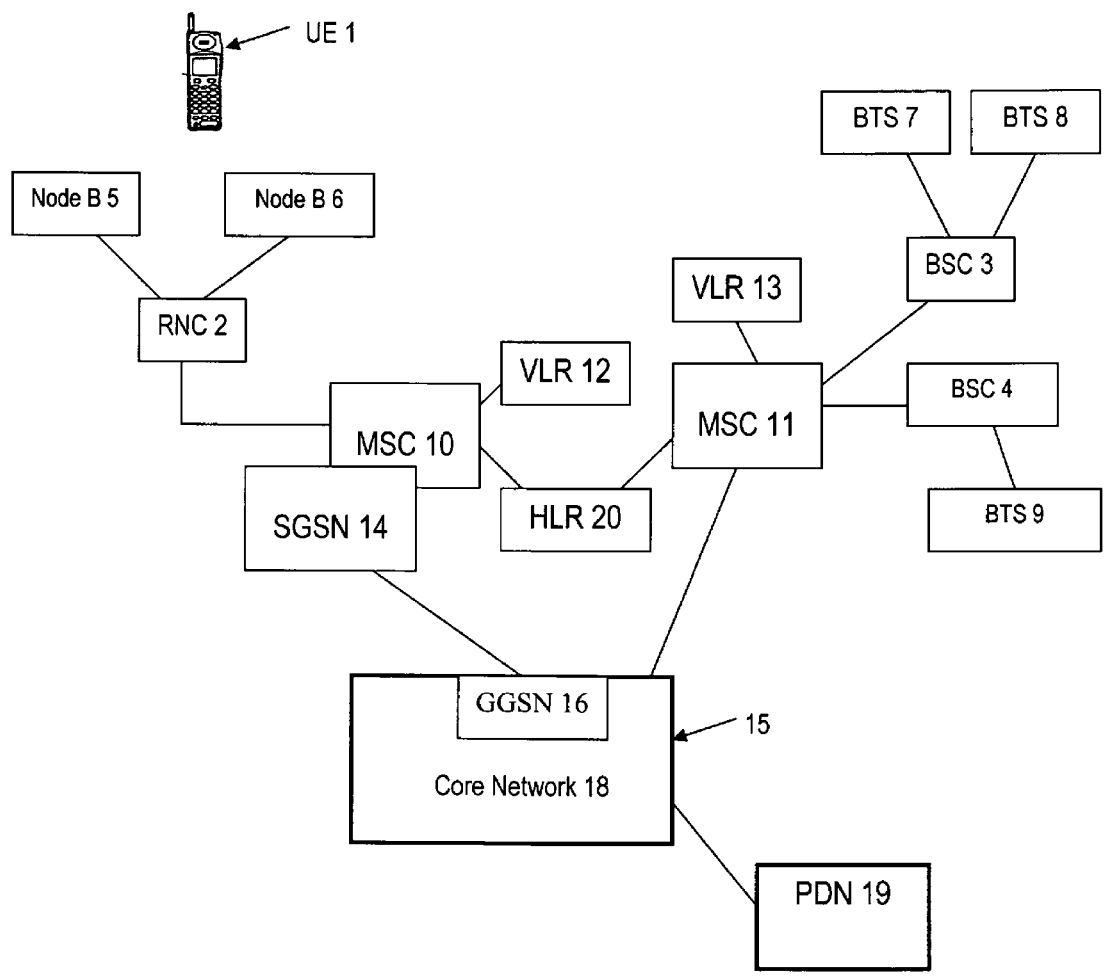
FIG. 1 illustrates an example telecommunications network configuration in which the embodiments of the present invention may be implemented.

A mobile terminal (UE) is shown in FIG. 1 at 1. The mobile terminal may be any suitable portable device, including a handheld mobile telephone, a personal digital assistant (PDA), dedicated traffic navigation device or a laptop computer equipped with a network connectivity datacard.

The telecommunications network illustrated in FIG. 1 includes a number Radio Access Networks (RANs), where each RAN serves a number of cells of the cellular/mobile telecommunication network.

In currently deployed cellular networks there are typically two different Radio Access Technologies: a second generation (2G) design following the GSM radio access standards and a third generation (3G) design following UMTS Terrestrial Radio Access Network (UTRAN) design. A 4G access standard, Long Term Evolution (LTE) is currently under development, so in the future there may also be further access standards coexisting.

In a 2G mobile telecommunications network, such as GSM, the RAN comprises a number of base transmission stations (BTSs) and base station controllers (BSCs). Each BSC (3, 4) typically controls a plurality of BTSs (7,8).

In a 3G mobile telecommunications network, such as UMTS, the RAN comprises a number of node Bs and radio network controllers (RNC). Each RNC (2) typically controls a plurality of node Bs (5, 6).

In a 4G mobile telecommunications network, such as LTE, the RAN comprises a number of eNodeBs (eNB) which perform functions equivalent to the Node B and RNCs of a 3G network. The eNBs are arranged in groups that are controlled by a Mobility Management Entity (MME) and Serving Gateway (S-GW)/PDN Gateway (P-GW).

The exact network configuration is not essential to the invention, so of course configurations and network types are possible.

Conventionally, in a UMTS network, the RNCs are arranged in groups and each group is controlled by one serving GPRS support node (SGSN), such as SGSN 14 for RNC 2. SGSN 14 is provided to support communications in the packet switched domain—such as GPRS data transmissions. The SGSN 14 is in turn connected to a gateway GPRS support node (GGSN 16), which provides a gateway to a Packet Data Network (PDN 19), such as the Internet.

Mobile Switching Centre (10) (MSC) functions in an analogous way to the SGSN, albeit in relation to circuit switched data (i.e. voice communications).

In a GSM network, the BSCs are arranged in groups, each having a serving MSC, such as MSC 11 for BSCs 3 and 4. In practice, the network will incorporate many more MSCs than shown in FIG. 1.

Each mobile terminal, to be communicable with the telecommunications networks, is typically provided with a smart card or SIM which identifies the subscriber to the network. In this regard, the SIM card is pre-programmed with a unique identification number, the "International Mobile Subscriber Identity" (IMSI), for use by the networks. The mobile terminal itself is also assigned an International Mobile Equipment Identity (IMEI). The IMEI typically includes information on the origin, model and serial number of the device. For instance the IMEI includes a Type Approval Code (TAC) which is an identity code for the handset type. For instance, this TAC will identify whether the terminal is an iPhone™, a Blackberry™ etc, and models of the same. The IMEI is communicated during the establishment of communications, and is principally used today for identifying stolen or banned handsets via an Equipment Identity Register (EIR).

With this background in mind, a first embodiment of the invention will be described.

Currently, the majority of mobile terminals are 3G capable, and 3G capable UEs are typically configured to camp on a 3G cell when in the inactive/idle state, where a 3G cell is available. This of course has the consequence of, when the terminal becomes active, it will use the 3G network it is currently camped on. When the transfer to active is triggered by the need to establish data communications there is no problem with this arrangement. However, it has been recognised that where communication is established for voice traffic it is similarly maintained on the 3G network, although these communications need not be maintained or established thereon, as the 2G networks are equally as capable of managing circuit switched communications. Therefore according to the present embodiment of the invention, voice communications are assessed for transferability to a coexisting 2G network, thereby releasing more 3G capacity for data services.

This transfer to 2G can be in relation to all voice only communications (i.e. not in relation to data communications or voice communications that include a data transfer aspect). Preferably, however, additional criteria is utilised in order to selectively transfer voice communications.

For example, some types of mobile terminals are capable of, and need to be able to perform voice and data functionalities at the same time. However, it has to be appreciated that once a device is pushed down to 2G, for instance upon a voice call being initiated, there is no possibility for the device to be pushed back to 3G to do voice and data, unless Dual Transfer Mode (DTM) is implemented in the network and the terminal. As DTM is a complex and costly option to implement in all 3G terminals and across the networks, it is preferable for the network to make a considered decision as to whether or not to initiate a voice communication in 3G, as per this embodiment of the invention.

Therefore, by pre-specifying types of mobile terminal which are ideally not offloaded from 3G to 2G, for example, the 3G blackberry device (i.e. to enable the user to send/receive an email whilst on a voice call), these such devices can be identified during a voice communication set-up, and never offloaded from 3G to GSM.

The mobile terminal types that are not be offloaded to 2G (or equivalently which are to be offloaded) are preferably stored in a list accessible by the core network (e.g. accessible by the MSC-S during call set-up). This list is preferably created by the 3G network service provider, and updated/altered as necessary.

The 3G core network is also configured to determine and store the terminal type for each mobile terminal registered therein. This is stored for future reference to determine whether the device should be prohibited and/or discouraged from being pushed to 2G for voice communications.

Figure 2:
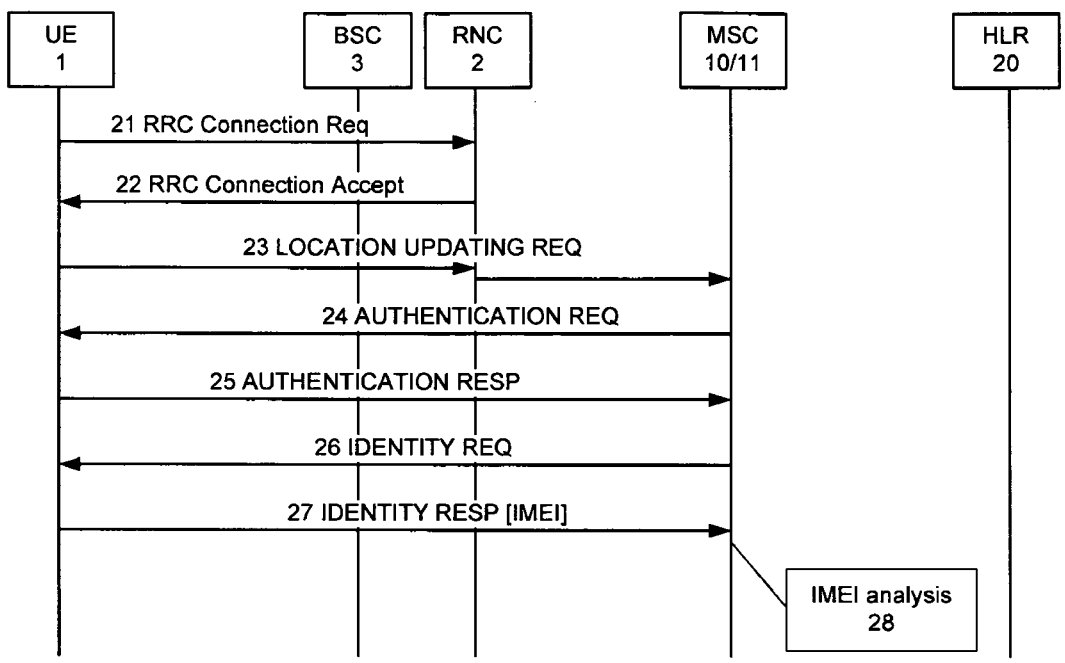
FIG. 2 illustrates an example of a 3G location updating procedure according to an embodiment of the invention.

With reference to FIG. 2, one example of how the IMEI of a mobile terminal can be provisioned to the 3G core network is illustrated. In this regard, the IMEI can be used to identify the type of each individual terminal. This terminal type identification is typically a numeric parameter.

The IMEI information may be provided by the mobile terminal to the 3G network upon powering up, so that it is ready for use when a voice communication is initiated with the mobile terminal. This information is preferably stored in relation to the mobile terminal's serving MSC (MSC-S). Similarly, when the mobile terminal is idle, and moves to a new MSC-S pool area, and the MSC-S is reallocated, the new MSC-S would initiate an IMEI Identity Request procedure in response to the UE performing a Location Area Update (LAU) procedure. A LAU covering these two situations is illustrated in FIG. 2.

More particularly, the UE initiates a LAU procedure by transmitting an RRC Connection Request 21 to the 3G Node B that it is to register with. In response, the Node B sends an RRC Connection Request 22. The UE then transmits a Location Updating Request 23 to the Node B, which forwards this Request 23 to its MSC, which will become the Serving MSC (MSC-S). In response, the MSC sends an Authentication Request 24 to the UE which in turn provides an appropriate Authentication Response 25. These communications are part of the 3G standards for a UE registering with a Node B upon power up or moving to a new location.

According to this embodiment of the invention, in addition to these standard communications, the MSC sends an Identity Request 26 to the UE, which replies with an Identity Response 27 which includes its IMEI.

If the UE accesses the network when camped on 2G, the device performs a similar well defined access procedure. As part of this procedure the same Identity Request process can be performed to retrieve the IMEI of the device.

Upon receiving the identity information, the MSC will perform appropriate IMEI analysis 28, such as extracting the relevant information from the IMEI and storing it in an appropriate location for future reference. Preferably the terminal identity information is stored in association with subscription information of the user at the Home Location Register (HIR) 20.

Figure 3:
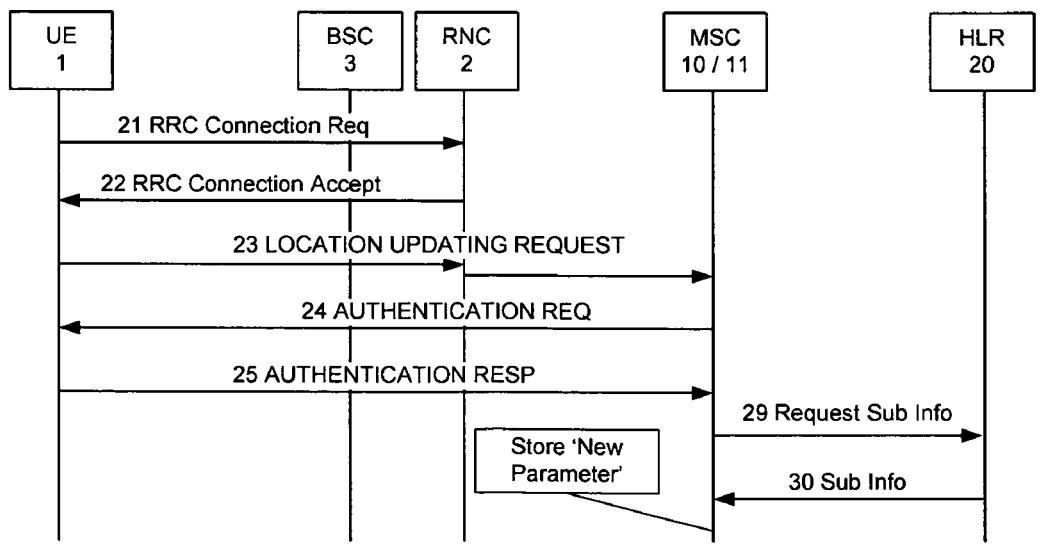
FIG. 3 illustrates an example of a 3G location updating procedure according to a second embodiment of the invention.

In an alternative to obtaining the IMEI from the UE at each Location Area Update, the terminal identity information may be pre-stored with the user's subscription data, and provided to the MSC from the core network upon request. This is shown in relation to FIG. 3. The Location Area updated steps 21-25 are performed as described in relation to FIG. 2. Then, instead of the MSC requesting identity information from the UE, it sends a Subscription Information Request 29 together with the IMEI to its HLR 20. The HLR 20 can then perform the IMEI analysis to verify the access requirements of the device type (i.e. whether it normally requires voice and data) and then modify/control the subscriber data accordingly. The HLR 20 replies with the Subscription Information 30.

In this regard, according to this embodiment of the invention it is proposed that a parameter be appended to the subscription information of the user at the HLR 20, which is passed from the HLR 20 to the MSC when the user attaches to the network, or relocates to a new MSC-S. This parameter indicates to the MSC whether the device should be prohibited and/or discouraged from being pushed to 2G for voice.

Figure 4:
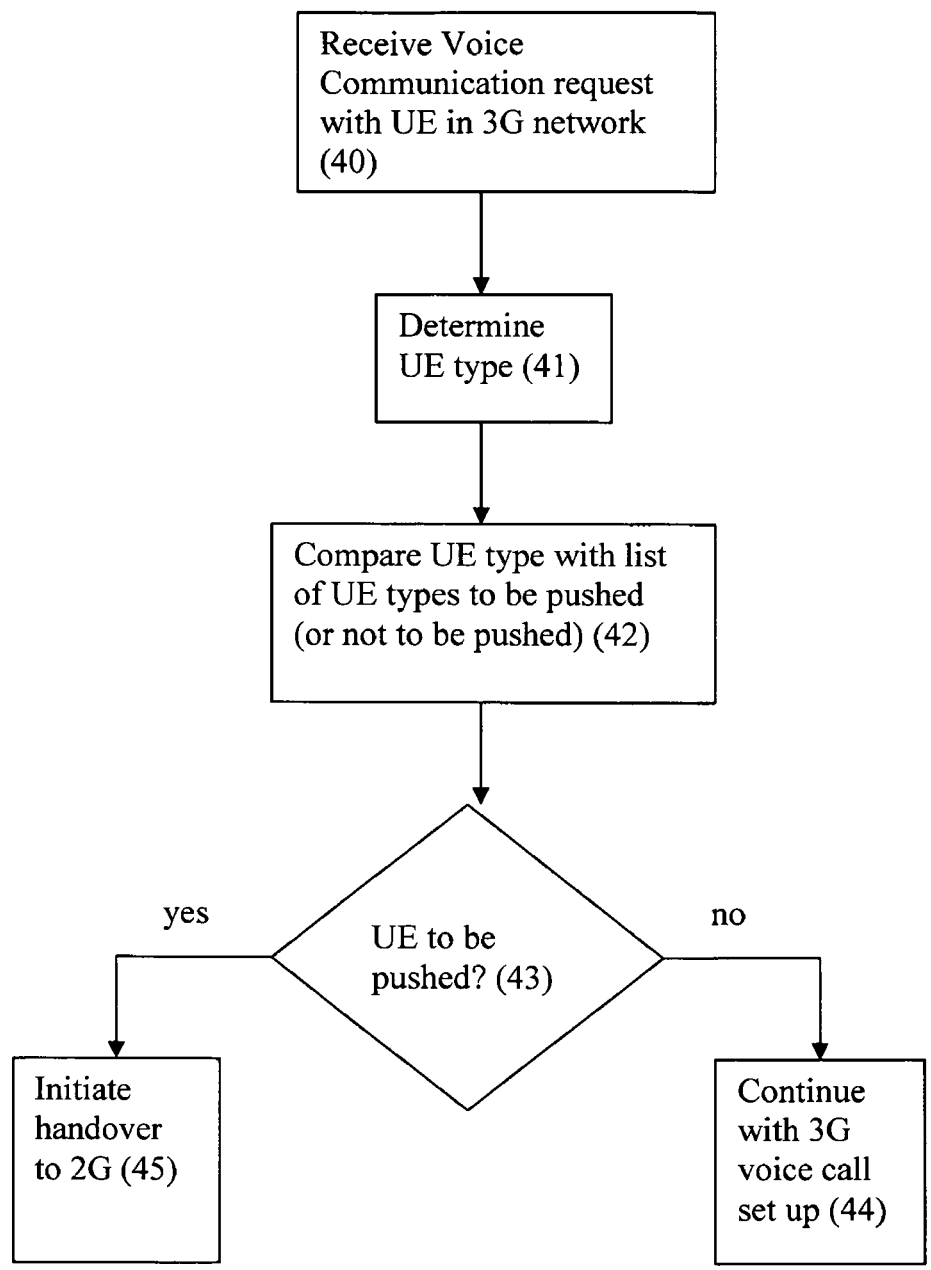
FIG. 4 illustrates a flow chart of an example of the analysis to take place during call set up according to a further embodiment of the invention.

With reference to FIG. 4, a description of the use of this parameter will be described according to a further embodiment of the invention. In this regard, an aim of the invention is to offload traffic from the 3G network that can be equivalently processed on a 2G network that is more likely to have a lower load. This traffic is voice traffic, but preferably in relation to only certain terminals, depending upon their capabilities.

Therefore, considering a Blackberry model terminal either initiating a voice call, or being the intended recipient of an incoming call, the 3G core network would receive the service request and analyse it appropriately. For a call initiated by the terminal, this analysis would typically be performed by the RNC-S. The network would determine the service requested, and data services would be processed on the usual manner. Where the request is a voice communication request, the functionality according to this embodiment of the invention is implemented.

In this regard, with reference to FIG. 4, the event of a 3G network receiving a voice communication request either from or to a particular UE (40), is a trigger to initiate a sub-procedure for determining whether or not to continue processing the voice communication request in the 3G network. According to this embodiment, the appropriate network element is configured to determine the UE type (41), which is preferably achieved by extracting the terminal parameter saved in relation to the UE's profile in the HLR 20. In this embodiment, the parameter uses the IMEI, the network element is configured to compare this parameter with a list of UE types to be pushed to the 2G network (or equivalent to be maintained on the 3G network) (42). That is, the parameter may be a component of the IMEI or based thereon. Therefore, where the parameter matches an entry on the list, the network element takes the appropriate action.

This comparison is preferably performed by the appropriate MSC-S, by programming all the MSC-Ss with the list of devices which need to stay on 3G. Alternatively, this comparison could be completed in the Equipment Identity Register (EIR) as the IMEI is already normally checked by this entity to establish instances of stolen or banned handsets. Therefore, the EIR is well placed to review the TAC/FAC part of the IMEI and determine if it is a device which is required to stay on 3G. If so, the EIR can provide the device type indication to the MSC/VLR.

Once it is determined that the voice communication is suitable to be pushed to the 2G network (43), the network initiates a handover of the communication to an appropriate 2G MSC (45). Alternatively if the comparison determines that the call shall be maintained on the 3G network, then the subroutine is exited, and the call set up procedure continued with (54).

Advantageously, this provides an avenue for reducing the load on 3G networks, without adversely affecting the user experience. That is, by differentiating which network to undertake voice calls on, based upon the terminal type, an informed analysis is able to be used to create additional capacity on a voice/data network.

In the embodiment just described, the parameter is the IMEI or a component thereof However, according to an alternative embodiment of the invention, the parameter may be a simple binary parameter or flag (e.g. set to "1" where offloading to 2G is permitted, and set to "0" where offloading is not permitted). This parameter is preferably pre-stored with the terminal user's subscription information at the HLR 20. The parameter may be set by the core network upon extracting the terminal's IMEI from network communications with the UE and comparing with a list of terminal types to be offloaded. Alternatively, the parameter could be set based on analysis of the service use of the user. This parameter can then be used as a control parameter with the known Service Handover functionality. In other words, the parameter is a control parameter, based upon the terminal or subscriber type.

The Service Handover control mechanism is a known procedure incorporated into 3G standards in order to allow the core network to provide information to the serving RAN that informs the RAN whether the subscription of the terminal is allowed to use another RAN, and accordingly whether the terminal should be moved immediately to the other RAN. This "Service Handover" mechanism was introduced to allow national roaming from "new market entrants" to be restricted to only a single RAN. In this original procedure to restrict national roaming, the triggering of the Service Handover by the serving RAN was dependent upon the user's IMSI (i.e. which contains the Mobile Country Code and Mobile Network Code).

The current embodiment of the invention similarly makes use of this Service Handover mechanism in order to initiate handover to 2G, based upon the terminal type. As indicated above, this parameter may be pre-stored with the user's subscription information on the HLR 20. Therefore, the network element managing the offload, where the parameter indicates the communication should be offloaded to 2G, uses the parameter as a control parameter to initiate the Service Handover mechanism.

The embodiments described above are concerned with defining the parameter based upon terminal type, and chiefly based upon the IMEI information.

Figure 5:
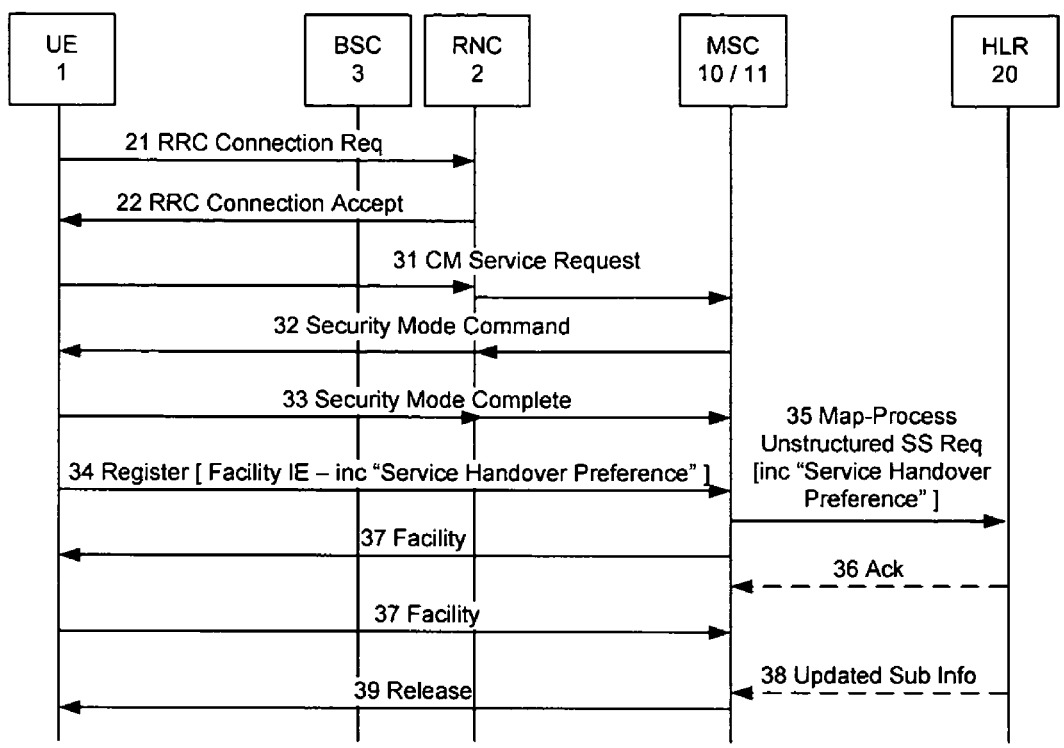
FIG. 5 illustrates an example of providing user preference information to the core network according to a third embodiment of the invention.

However, based upon this core concept of offloading voice communications based upon terminal type, further embodiments of the invention may be extrapolated, with a variation being that the user may be provisioned with the ability to enter the parameter information via the Man Machine Interface (MMI) provided on their terminal. In this regard, the MMI may be used to input Unstructured Supplementary Service Data (USSD) to set the parameter or even to update/override any default setting set by the network service provider for the user's terminal type in regard to the Service Handover mechanism. This is shown in FIG. 5.

In this regard, to establish a connection with the network, the terminal first sends an RRC Connection Request 21, and the 3G network it is camped upon sends an RRC Connection Request Accept 22. The UE then send a Connection Management (CM) Service Request 31, to the Node B, which is forwarded to the MSC-S. This command indicates to the core network that the user of the UE wants to communicate USSD via the MME. In response, the MSC-S establishes a secure communication channel with the UE via a Security Mode Command 32. The UE confirms the establishment of the secure mode with a Security Mode Complete 32 response.

In this embodiment the USSD is to be communicated is in relation to a Service Handover Preference procedure, which is communicated to the MSC-S in message 34. The MSC-S accordingly notifies the HLR 20 that it is about to receive USSD which needs to be mapped in relation to the Service Handover procedure 35. This is typically acknowledged by the HLR 36. The MSC-S also provides the UE with a facility 37 to provide the necessary data, which is returned to the MSC-S, together with the new parameter data 38. Upon completion of the USSD transfer, the MSC-S sends a release message 39 to the UE in order to terminate the secure channel communication.

The new parameter data is stored at the HLR 20. The HLR 20 then updates the Visited Location Register (VLR) as necessary.

In a further alternative, rather than the USSD data being provided by the user from their mobile terminal, the data may be provided to the HLR 20 by the user using MMI and a web interface to the HLR 20. Again, the HLR 20 would update the VLR as necessary.

As indicated above, adjusting the parameter allows the user of the terminal to adapt the networks treatment of their calls according to their needs.

According to a still further embodiment, the terminal itself may adjust the new parameter. For instance, the new HLR 20 parameter could be driven by the battery indicator of the device. This embodiment would allow the device itself to choose the most 'speech efficient radio interface' when the device is low on battery, and updates the parameter in the HLR 20. For instance, an engine (preferably located on the terminal) could monitor the device battery level, and when the device is charged, inform the HLR 20 that it is no longer is battery-restricted, and the device can again use the more feature-rich access technology (e.g. LTE). In this embodiment of the invention, the parameter is still dependent upon a terminal characteristic, but not the terminal type.

Another related embodiment allows the terminal itself to again adjust the new service handover parameter, this time using an engine driven by a calendar associated with the terminal. For instance, the engine is configured to select the appropriate offload/maintain parameter based upon information obtained an Outlook™ calendar of the user, which is preferably located on the terminal and may be regularly synchronised with a central server.

For example, the offload decision in this embodiment can be based upon the length of a proposed conference call. That is, the engine may be configured to modify the parameter to offload to 2G (which uses less power than 3G) where the proposed conference call exceeds a predetermined duration threshold. Similarly, the engine may also take into consideration the available battery charge, so that the engine may be configured to compare the proposed conference duration with the battery charge level, and based upon this comparison modify the parameter to offload to 2G if power level is likely to be an issue. Alternatively or in addition, these comparisons may be used by the engine on the terminal to alert the user to the need to charge the mobile.

The embodiments are not to be considered as a strict definition of the invention, and alterations and additions are possible within the inventive concept.

For instance, the embodiments have chiefly been described in relation to offloading traffic from 3G networks onto 2G networks. However, the inventive concept has applicability to offloading to 2G networks from the proposed 4G network (LTE) and also potentially from LTE to 3G. In this regard, for LTE devices, similar core network procedures to those described above may be performed at the Mobility Management Entity (MME) in order to prompt an early handover (e.g. using Single Radio Voice Call Continuity (SR-VCC) or CS Fall Back) to 2G (or to 3G, if 3G has better battery performance). In this LTE example, the IMEI can be provided back to the HSS (equivalent to the HLR 20), which can perform the IMEI analysis to verify the access requirements of the device type (i.e. whether it normally requires voice and data) and then modify/control the insert subscriber data accordingly.

Further whilst the embodiments of the invention are principally described in relation to handing over from 3G to 2G upon or during call establishment, this is not essential to the invention, and the handover could occur once the call has been established. This option however is less preferable, as it would be more complex, requiring more signalling than the call establishment embodiments.

The invention claimed is:

1. In a mobile telecommunications network including at least a first type of radio access network and a second type of radio access network and a mobile terminal, a method of establishing a voice communication with the mobile terminal comprising:
    receiving a voice communication request in relation to the mobile terminal on the second radio access network type;
    determining a parameter associated with a terminal characteristic;
    determining an estimated length of the voice communication with the mobile terminal; and using the parameter and a battery level of the mobile terminal to determine whether to establish the voice communication on the first type of radio access network or maintain the voice communication on the second type of radio access network, wherein, in a comparison, the estimated length of the voice communication is compared with the battery level, and wherein the comparison is used in determining whether to establish the voice communication on the first type of radio access network or maintain the voice communication on the second type of radio access network.

2. The method of claim 1 wherein the determined parameter is a parameter relating to a terminal type for the mobile terminal.

3. The method of claim 2 further including determining the terminal type parameter by determining an International Mobile Equipment Identity (IMEI) associated with the mobile terminal.

4. The method of claim 2 further including determining the terminal type parameter by extracting a parameter from a profile stored on the core network in relation to the mobile terminal.

5. The method of claim 2 wherein the parameter is used to determine where to establish the voice communication by comparing the terminal type parameter with:
  a list of terminal types to be maintained on the second radio access network during the voice communication; and/or
  a list of terminal types to be offloaded to the first radio access network type for the voice communication.

6. The method of claim 1 further including determining the parameter during/in association with a location update procedure and storing the determined parameter in a user profile in advance of the voice communication initiation.

7. The method of claim 6 wherein upon determining to establish the voice communication on the first radio access network type, initiating a handover from the second radio access network type to the first radio access network type.

8. The method of claim 7 wherein the first type of radio access network is a 2G network and the second type of radio access network is a 3G network.

9. The method of claim 1 wherein upon determining to establish the voice communication on the first radio access network type, initiating a handover from the second radio access network type to the first radio access network type.

10. The method of claim 1 wherein the first type of radio access network is a 2G network and the second type of radio access network is a 3G network.

11. The method of claim 1 wherein the first type of radio access network is a 2G network and the second type of radio access network is a 3G network and wherein upon determining that the battery level is relatively low, initiating a handover from the second radio access network type to the first radio access network type.

12. The method of claim 1 wherein the first type of radio access network is a 2G network and the second type of radio access network is a 3G network and wherein upon determining that the estimated length of the voice communication is relatively long, initiating a handover from the second radio access network type to the first radio access network type.

13. The method of claim 1, wherein, in a second comparison, the parameter of the mobile terminal is compared with at least one of: (i) a list of terminal types to be maintained on the second radio access network during the voice communication, or (ii) a list of terminal types to be offloaded to the first radio access network type for the voice communication, and wherein the second comparison is further used in determining whether to establish the voice communication on the first type of radio access network or maintain the voice communication on the second type of radio access network.

14. In a mobile telecommunications network including at least a first type of radio access network and a second type of radio access network and a mobile terminal, a network element for establishing a voice communication with the mobile terminal, the network element configured to:
  receive a voice communication request in relation to the mobile terminal on the second radio access network type;
  determine a parameter associated with a terminal characteristic;
  determine an estimated length of the voice communication with the mobile terminal; and
  use the parameter and a battery level of the mobile terminal to determine whether to establish the voice communication on the first type of radio access network or maintain the voice communication on the second type of radio access network, wherein, in a comparison, the estimated length of the voice communication is compared with the battery level, and wherein the comparison is used in determining whether to establish the voice communication on the first type of radio access network or maintain the voice communication on the second type of radio access network.

15. The network element of claim 14 wherein the parameter that the network element is configured to determine relates to a terminal type for the mobile terminal, and the network element is further configured to determine the terminal type parameter by determining an International Mobile Equipment Identity (IMEI) associated with the mobile terminal.

16. The network element of claim 15 further configured to determine the terminal type parameter by extracting a parameter from a profile stored on the core network in relation to the mobile terminal.

17. The network element of claim 16 wherein the network is further configured to use the parameter to determine where to establish the voice communication by comparing the terminal type parameter with:
  a list of terminal types to be maintained on the second radio access network during the voice communication; and/or
  a list of terminal types to be offloaded to the first radio access network type for the voice communication.

18. The network element of claim 15 wherein the network is further configured to use the parameter to determine where to establish the voice communication by comparing the terminal type parameter with:
  a list of terminal types to be maintained on the second radio access network during the voice communication; and/or
  a list of terminal types to be offloaded to the first radio access network type for the voice communication.

19. The network element of claim 14 wherein the network element is further configured to:
  determine the parameter during a location update procedure; and
  to store the determined parameter in a user profile in advance of the voice communication initiation.

20. The network element of claim 19 wherein the network element is further configured, upon determining to establish the voice communication on the first radio access network type, to initiate a handover from the second radio access network type to the first radio access network type.

21. The network element of claim 20 wherein the first type of radio access network is a 2G network and the second type of radio access network is a 3G network and the network element is a 3G Radio Network Controller (RNC).

22. The network element of claim 14 wherein the network element is further configured, upon determining to establish the voice communication on the first radio access network type, to initiate a handover from the second radio access network type to the first radio access network type.

23. The network element of claim 14 wherein the first type of radio access network is a 2G network and the second type of radio access network is a 3G network and the network element is a 3G Radio Network Controller (RNC).

24. The network element of claim 14 wherein the first type of radio access network is a 2G network and the second type of radio access network is a 3G network and the network element is a 3G Radio Network Controller (RNC) and wherein the network element is further configured, upon determining that the battery level is relatively low, to initiate a handover from the second radio access network type to the first radio access network type.

25. The network element of claim 14 wherein the first type of radio access network is a 2G network and the second type of radio access network is a 3G network and the network element is a 3G Radio Network Controller (RNC) and wherein the network element is further configured, upon determining that the estimated length of the voice communication is relatively long, to initiate a handover from the second radio access network type to the first radio access network type.

26. The network element of claim 14, wherein, in a second comparison, the parameter of the mobile terminal is compared with at least one of: (i) a list of terminal types to be maintained on the second radio access network during the voice communication, or (ii) a list of terminal types to be offloaded to the first radio access network type for the voice communication, and wherein the second comparison is further used in determining whether to establish the voice communication on the first type of radio access network or maintain the voice communication on the second type of radio access network.

* * * * *